(12) United States Patent
Alnafoosi et al.

(10) Patent No.: US 10,133,635 B2
(45) Date of Patent: Nov. 20, 2018

(54) LOW-WIDTH VAULT IN DISTRIBUTED STORAGE SYSTEM

(71) Applicant: International Business Machines Corporation, Armonk, NY (US)

(72) Inventors: Ahmad Alnafoosi, Streamwood (IL); Andrew D. Baptist, Mt. Pleasant, WI (US); Wesley B. Leggette, Chicago, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/817,427

(22) Filed: Nov. 20, 2017

(65) Prior Publication Data

US 2018/0074904 A1    Mar. 15, 2018

Related U.S. Application Data

(63) Continuation-in-part of application No. 15/352,292, filed on Nov. 15, 2016, which is a continuation of
(Continued)

(51) Int. Cl.
*G06F 11/10* (2006.01)
*G06F 3/06* (2006.01)

(52) U.S. Cl.
CPC .......... *G06F 11/1092* (2013.01); *G06F 3/064* (2013.01); *G06F 3/067* (2013.01); *G06F 3/0619* (2013.01); *G06F 2211/1028* (2013.01)

(58) Field of Classification Search
CPC ........ G06F 3/0619; G06F 3/064; G06F 3/067; G06F 11/1092; G06F 2211/1028
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Joseph R Kudirka
(74) *Attorney, Agent, or Firm* — Garlick & Markison; Timothy W. Markison; Edward J. Marshall

(57) ABSTRACT

A method includes storing a first set of data slices in a standard-width vault using a first group of DS units of a distributed storage network (DSN). The first set of data slices corresponds to a first representation of a data object, and includes a first write-threshold number of data slices encoded using a first set of dispersal parameters specifying first write and read widths associated with the standard-width vault. A second set of data slices, corresponding to a second representation of the data object, is stored in a low-width vault using a second group of DS units. The second set of data slices includes at least a second write-threshold number of data slices encoded using a second set of dispersal parameters specifying second write and read widths associated with the low-width vault. The low-width vault has a lower width read and/or write width than the standard-width vault.

17 Claims, 6 Drawing Sheets

Related U.S. Application Data application No. 14/306,312, filed on Jun. 17, 2014, now Pat. No. 9,501,360.

(60) Provisional application No. 61/841,603, filed on Jul. 1, 2013.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,718,434 B2 * | 4/2004 | Veitch ............... G06F 3/0605 711/114 |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,055,938 B1 * | 11/2011 | Chatterjee ........... G06F 11/1084 714/6.21 |
| 8,972,694 B1 * | 3/2015 | Dolan ..................... G06F 13/28 711/170 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0002946 A1 | 1/2007 | Bouton et al. | |
| 2007/0074266 A1 | 3/2007 | Raveendran et al. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0029711 A1 | 2/2011 | Dhuse et al. | |
| 2011/0029836 A1 | 2/2011 | Dhuse et al. | |
| 2011/0185141 A1 * | 7/2011 | Dhuse ................ H04L 67/1097 711/165 |
| 2012/0054500 A1 | 3/2012 | Dhuse et al. | |
| 2013/0124798 A1 * | 5/2013 | Aszmann .............. G06F 3/0689 711/114 |
| 2013/0151927 A1 | 6/2013 | Leggette et al. | |
| 2014/0351659 A1 | 11/2014 | Dhuse et al. | |
| 2015/0100727 A1 * | 4/2015 | Baptist ................ H04L 67/1097 711/114 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Jay J. Wylie, Survivable Information Storage System, IEEE, pp. 61-68, Aug. 2000.
International Searching Authority; International Search Report and Written Opinion; International Application No. PCT/US2014/044869; dated Nov. 19, 2014; 9 pgs.
European Patent Office; Extended European Search Report; EP Application No. 14819242.0; dated Feb. 10, 2017; 8 pgs.

* cited by examiner distributed, or dispersed, storage network (DSN) 10

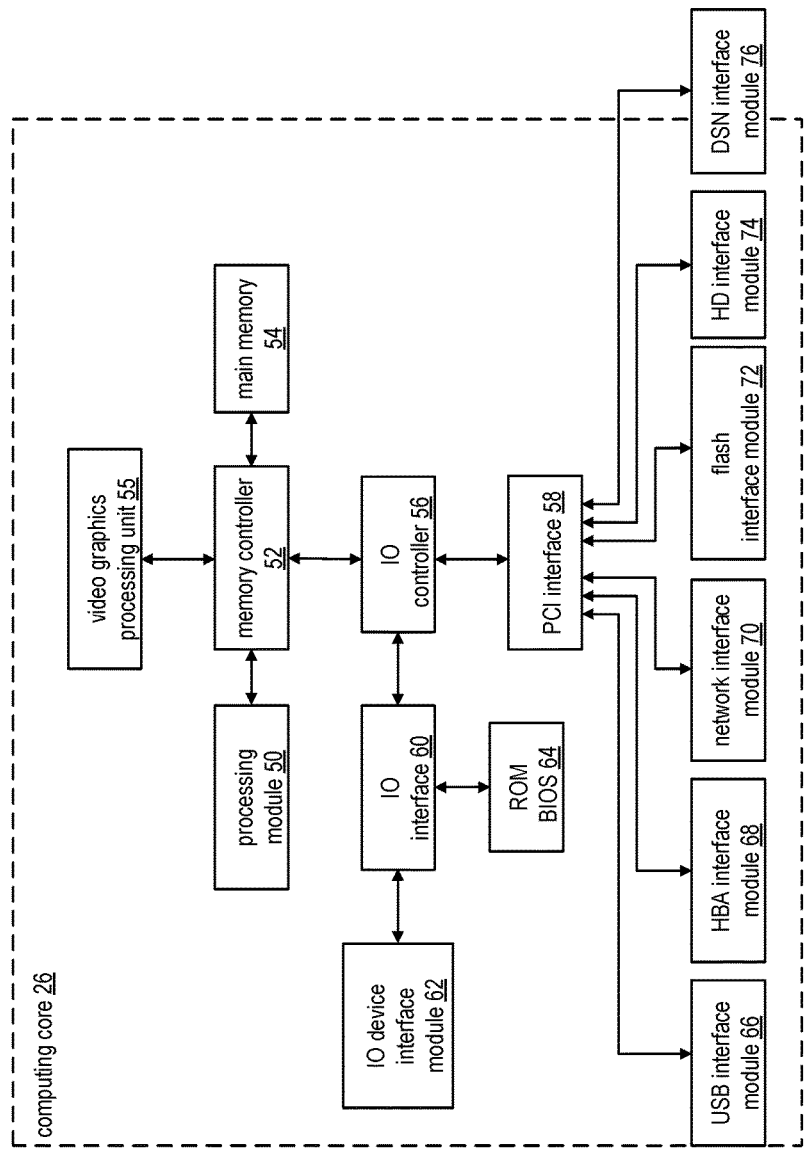

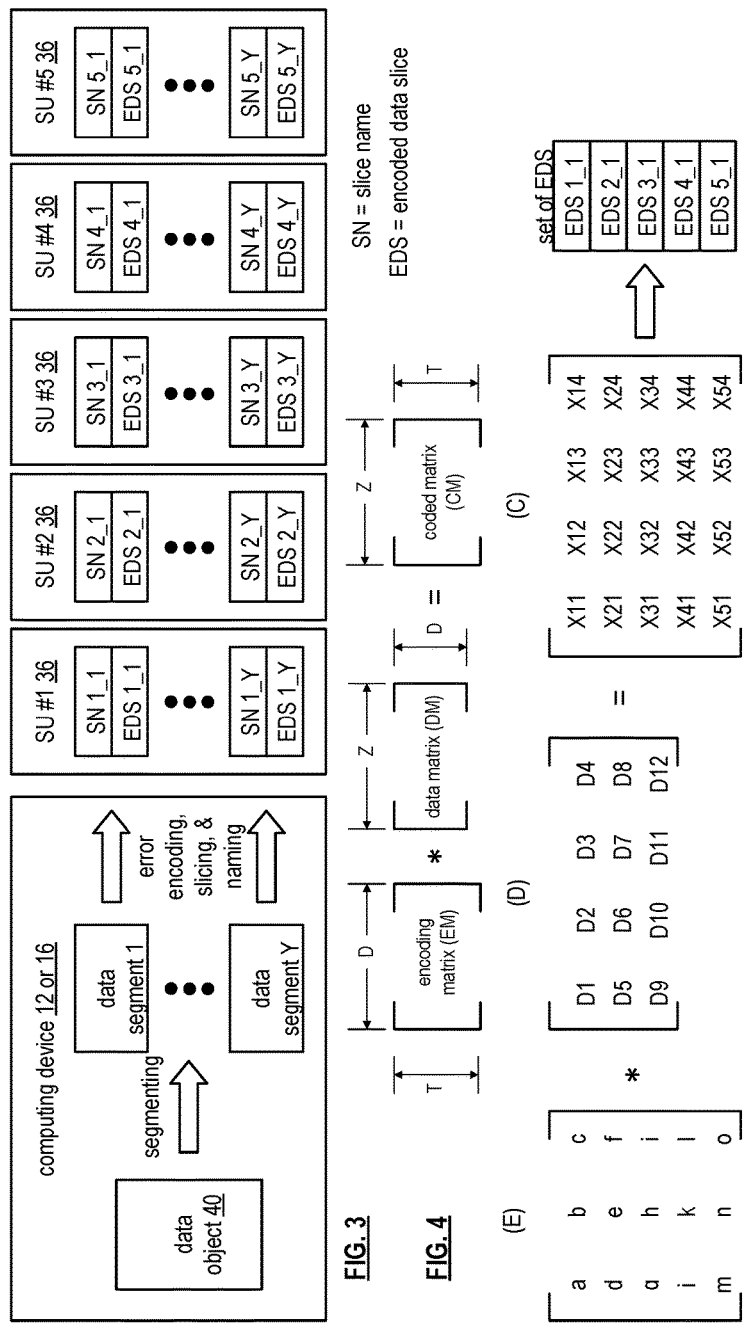

LOW-WIDTH VAULT IN DISTRIBUTED STORAGE SYSTEM

CROSS-REFERENCE TO RELATED APPLICATIONS

The present U.S. Utility Patent Application claims priority pursuant to 35 U.S.C. § 120 as a continuation-in-part of U.S. Utility application Ser. No. 15/352,292, entitled "REBUILDING DATA WHILE READING DATA IN A DISPERSED STORAGE NETWORK", filed Nov. 15, 2016, which claims priority pursuant to 35 U.S.C. § 120 as a continuation of U.S. Utility application Ser. No. 14/306,312, entitled "REBUILDING DATA WHILE READING DATA IN A DISPERSED STORAGE NETWORK," filed Jun. 17, 2014, issued as U.S. Pat. No. 9,501,360 on Nov. 22, 2016, which claims priority pursuant to 35 U.S.C. § 119(e) to U.S. Provisional Patent Application No. 61/841,603, entitled "ACCESSING PERMUTATIONS OF DATA WITHIN A DISPERSED STORAGE NETWORK", filed Jul. 1, 2013, all of which are hereby incorporated herein by reference in their entirety and made part of the present U.S. Utility Patent Application for all purposes.

BACKGROUND

This invention relates generally to computer networks and more particularly to dispersing error encoded data.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Some memory devices used in various storage applications are not only constrained by a maximum throughput, but also by a maximum number of input/output operations per second (IOPS). For example, a hard drive may sustain 100 MB/s, but be limited to 100 random IOPS. If the object size (or slice size) is small, the throughput may be constrained by the IOPS and be significantly lower than the maximum capability of the drive. In a memory device that is IOPS constrained, performance is inversely proportional to the number of slices that need to be written or read. Currently available systems do not generally provide an efficient way of addressing this constraint.

SUMMARY

A distributed storage network (DSN) including a plurality of distributed storage (DS) units used to store encoded data slices, along with methods and devices for use in a DSN, are disclosed herein. A first set of data slices corresponding to a first representation of a data object is stored in a standard-width vault including a first plurality of DS units. The first set of data slices includes at least a first write-threshold number of data slices encoded using a first set of dispersal parameters, wherein the first set of dispersal parameters specifies a first write-width and a first read-width associated with the standard-width vault.

A second set of data slices corresponding to a second representation of the data object is stored in a low-width vault including a second plurality of DS units. The second set of data slices includes at least a second write-threshold number of data slices encoded using a second set of dispersal parameters. The second set of dispersal parameters specifies a second write-width and a second read-width associated with the low-width vault. At least one of the second write-width or the second read-width associated with the low-width vault is less than a corresponding first write-width or first read-width associated with the standard-width vault.

In various embodiments, a read request associated with a data object is received at a computing device, which determines that the first representation of the data object is being stored in the standard-width vault. The computing device also determines that the second representation of the data object is stored in the low-width vault. The computing device can then select between retrieving either the first representation of the data object from the standard-width vault or the second representation of the data object from the low-width vault. If the second representation of the data object is not retrievable from the low-width vault, the first representation of the data object can be retrieved from the standard-width vault.

In some embodiments, the selecting which of the standard-width or low-width vault to use for retrieval includes determining expected performance levels of the standard-width vault and the low-width vault, and making the selection based, at least in part, on those expected performance levels.

In some embodiments, the computing device can derive the second representation of the data object by generating a reduced-size version of the first representation of the data object. Storing either or both of the first and second representations of the data object can include receiving a write request associated with a particular data object, and in response to receiving the write request, determining which of the standard-width vault and the low-width vault to use for storage of the particular data object based, at least in part, on indicators associated with the particular data object. The indicators associated with the particular data object can, in some embodiments, include at least one of: an object size, an object fidelity, an expected frequency of write operations, or a flag passed from a requester.

BRIEF DESCRIPTION OF THE DRAWINGS

FIG. 2 is a schematic block diagram of an embodiment of a computing core in accordance with the present invention;

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION

Figure 1:
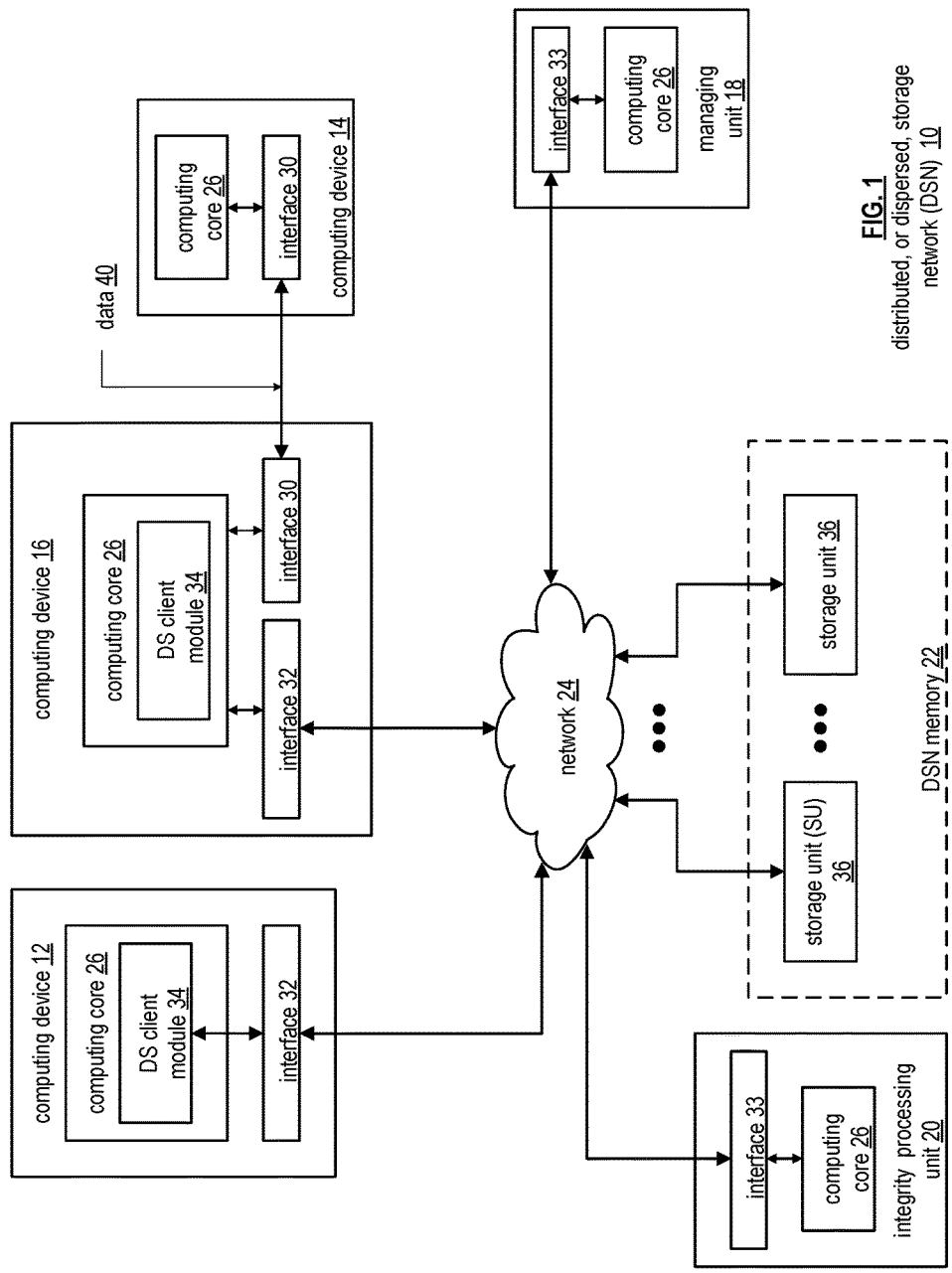
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
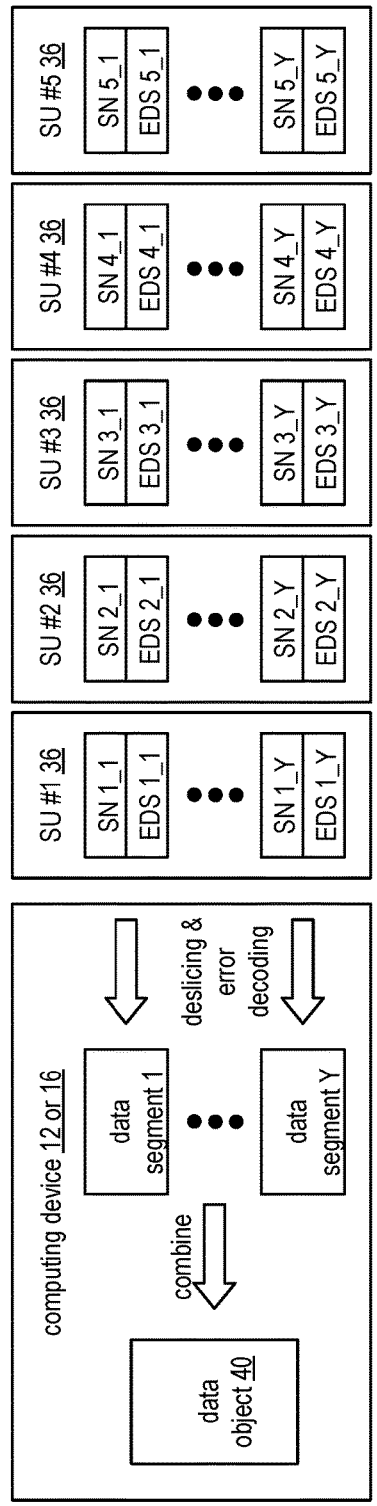
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
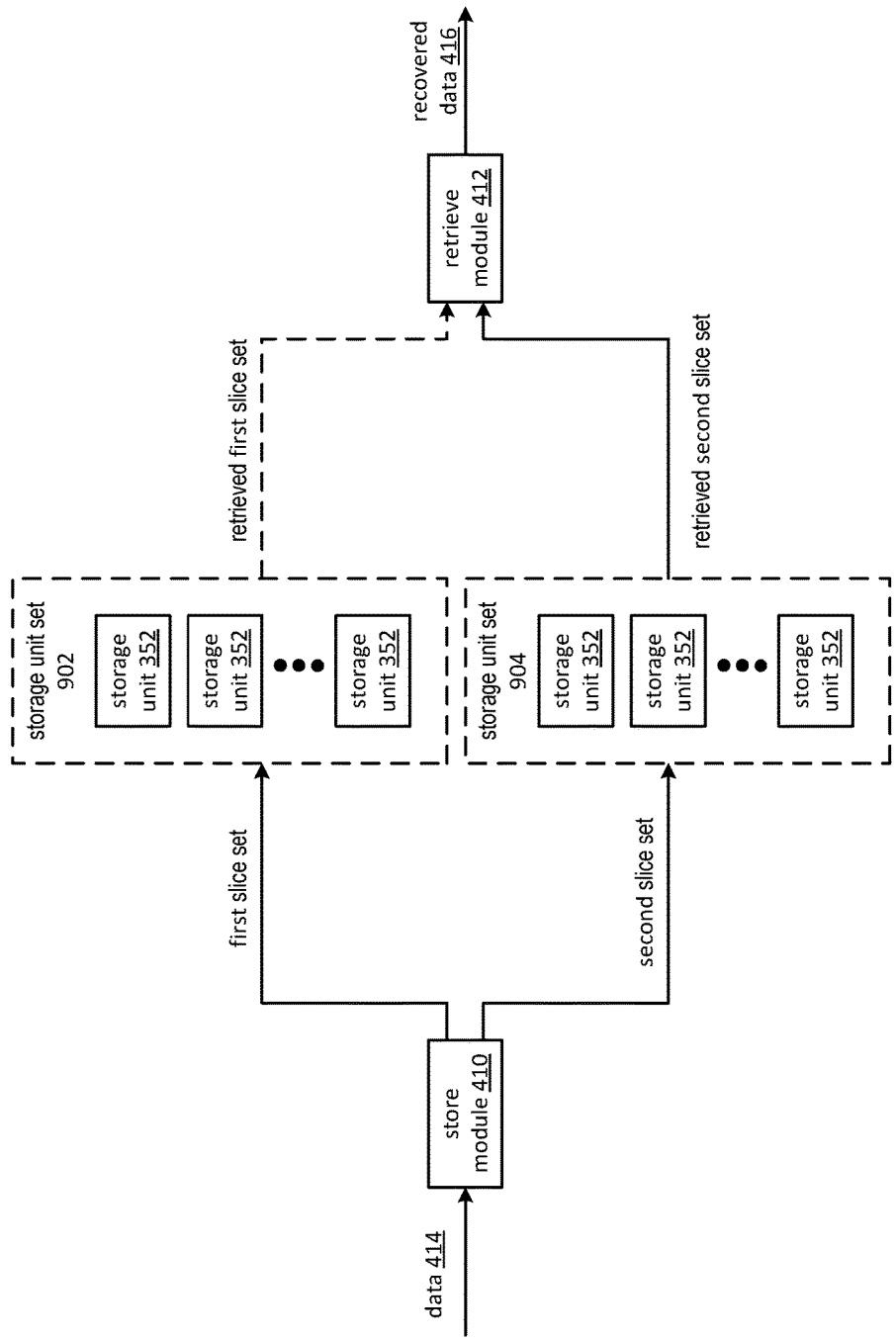
FIG. 9 is a diagram of an embodiment of a dispersed storage network in accordance with the present invention.
Figure 10:
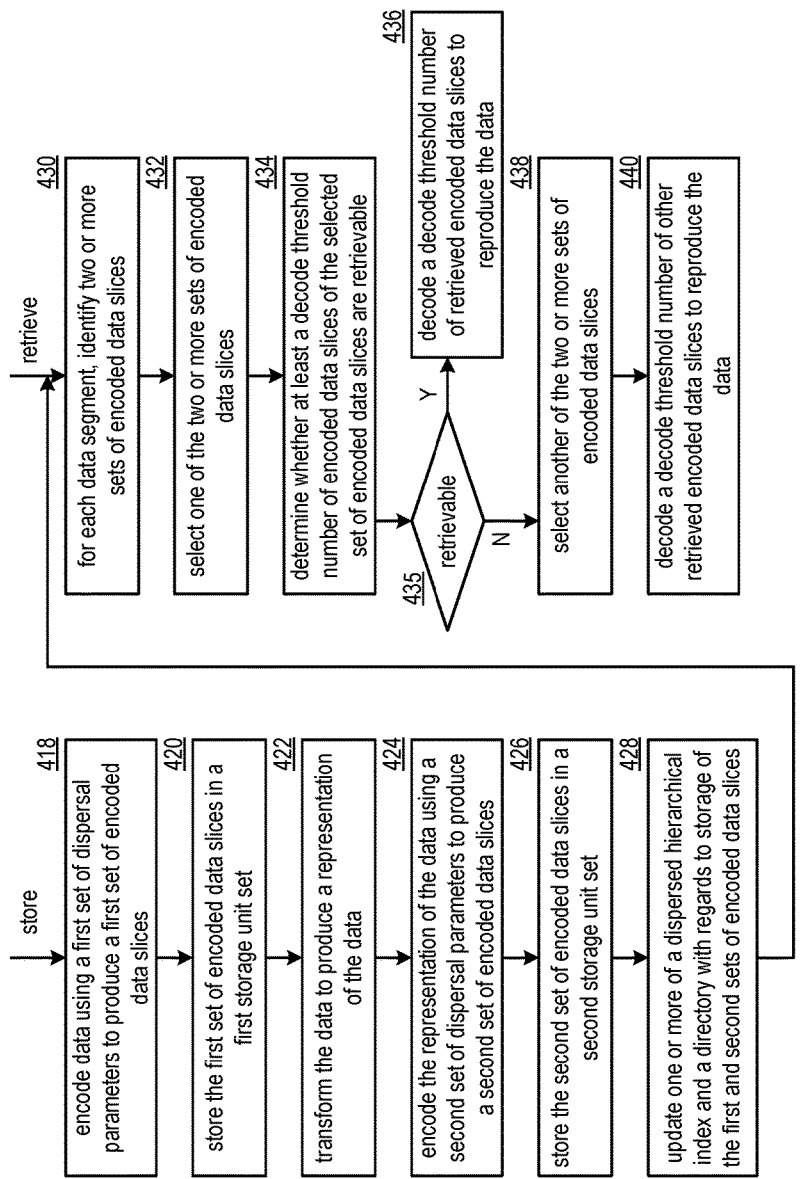
FIG. 10 is a flowchart illustrating an example of accessing data in accordance with the present invention.

Referring next to FIGS. 9 and 10, improved memory storage/retrieval techniques, systems, and devices that employ both standard-width vaults and low-width vaults will be discussed. In general, writing data that has been encoded into slices for dispersed/distributed storage in a distributed storage network (DSN) memory, results in at least a write threshold number of Input/Output operations (IOs) across at least a write threshold number of memory devices. Similarly reading encoded data slices results in a read threshold number of IOs. Some memory devices are not only constrained by a maximum throughput, but by a maximum number of IOs Per Second or (IOPS). For example, a hard drive may sustain 100 MB/s, but be limited to 100 random IOPS. If the object size (or slice size) is small, the throughput may be constrained by the IOPS and be significantly lower than the maximum capability of the drive.

In a DSN memory that is IOPS constrained, performance is inversely proportional to the number of slices that need to be written or read (which can be determined by the width, threshold, and write threshold). In such a system, performance would be greatest if width=threshold=writethreshold=1, as any given read or write will result in only one IOP on one memory device. In various embodiments, certain low-width vaults are designed with purposefully low widths or thresholds (such as 1-of-3, or 1-of-1). But the benefit in performance comes at the expense of reliability.

To address this, a DSN memory may be deployed with at least two vaults, one a high reliability vault with a typical (standard) width and thresholds, while a low-width vault will be configured with lower widths and thresholds. When writing objects, the object may be written to both vaults, but all read requests by default go to the low-width vault. Only if the object is missing from the low-width vault the ds processing unit will attempt to read it from the normal width vault.

In many configurations, the small objects written to the low-width vault may be derivable from a higher-fidelity copy written to the high-reliability vault. For example, thumbnails may be written to the low-width vault, and the full scale images to the normal vault. Since thumbnails are read frequently and often, and each is small, there is a high IOPS requirement, yet if a thumbnail is lost, it can be easily regenerated from the corresponding object stored on the other vault.

A computing device, such as a DS processing unit, may automatically determine when to write an object to the normal-width vault or the low-width vault based on a number of indicators. The indicators may include the object size, an object fidelity, a frequency of write operations, a flag passed from the requester, etc. When the indicators hint or specify that the object will be subject to frequent IOs, the DS processing unit can elect to write a copy to the low-width vault. When it is determined that the object is derived from an already stored high-fidelity copy the DS processing unit may decide not to store the object to the normal-width vault. In at least some embodiments, both the normal-width vault and the low-width vault can be implemented using some or all of the same storage devices.

FIG. 9 is a diagram of an embodiment of a dispersed storage network (DSN) that includes a store module 410, storage unit sets 902 and 904, and a retrieve module 412. The DSN may include any number of storage unit sets. The store module 410 and the retrieve module 412 may be implemented utilizing one or more modules implemented using a computing device such as computing devices 12, 14, or 16 of FIG. 1 implementing, a dispersed storage (DS) processing module, or a DS processing unit, an integrity processing unit 20 of FIG. 1, a managing unit 18 of FIG. 1, or a computing device included in DSN memory 22. Each of the storage unit sets 902 and 904 includes a set of storage units 352, which are similar to storage units 36 of FIG. 1, where a number of storage units for each storage unit is set in accordance with a unique set of dispersal parameters associated with the storage unit set. Storage unit sets 902 and 904 can be made up of one or more of the same storage units 352. So for example, there may be a physical set of 30 storage units. A first vault could employ an information dispersal algorithm (IDA) configuration that encodes slices using a 20-of-30 IDA, and store those 30 slices across all 30 storage units. That same set of 30 storage units could also be used to implement a second vault using a 2-of-3 IDA configuration, and a subset including 3 of the 30 storage units can be selected each time data is stored. Thus, over time, all 30 of the storage units (in 3 unit subsets) can be selected for use by the second vault at different times. As a result, in some implementations, the same set of 30 storage units are used to hold slices for both encodings, and storage unit sets 902 and 904 actually include the same physical storage units, or parts thereof.

Each set of dispersal parameters for the storage unit sets 902 and 904 is established to meet particular performance, reliability, and availability goals for storage and retrieval of data. For example, storage unit set 902 includes 16 storage units and storage unit set 904 includes three storage units when a pillar width of a first set of dispersal parameters associated with storage unit set 902 is 16 and a pillar width of a second set of dispersal parameters associated with storage unit set 904 is 3. In such an example, the pillar width of 16 may be established when a goal associated with storage unit set 902 includes higher than average storage availability and higher than average retrieval reliability and the pillar width of 3 may be established when a goal associated with storage unit set 904 includes minimizing input/output operations within the DSN to store and retrieve the data.

The DSN functions to receive data 414, store the data 414 in the storage unit sets, 902 and 904, and subsequently retrieve the data from the storage unit sets as recovered data 416. The store module 410 performs a series of steps to store the data 414 in the storage unit sets and the retrieve module 412 performs another series of steps to subsequently retrieve the data from the storage unit sets to produce the recovered data 416.

In an example of operation, the store module 410 receives the data 414 for storage (e.g., a data segment of the plurality of data segments of a data object) and encodes the data 414 using a dispersed storage error coding function and in accordance with the first set of dispersal parameters associated with the storage unit set 902 to produce first slice set of encoded data slices. The store module 410 outputs the first slice set to the storage unit set 902 for storage.

Having stored the data as the sliced set 1 in the storage unit set 1, the store module 410 generates a representation of the data to include at least one of the data, a compressed version of the data, a redacted version of the data, and a transformed version of the data. The store module 410 encodes the representation of the data using the dispersed storage error coding function and in accordance with the second set of encoded dispersal parameters associated with the storage unit set 904 to produce a second slice set. For example, the store module 410 encodes the representation of the data to generate a set of three slices as the second slice set. The store module 410 outputs the second slice set to the storage unit set 902 for storage. The store module 410 updates one or more of a dispersed hierarchical index and a directory to include addressing information (e.g., a data ID, a data ID for the representation of the data, and one or more DSN addresses)

The retrieve module 412, when retrieving the data, identifies two or more sets of encoded data slices stored in two or more storage unit sets of the DSN. The retrieve module 412 selects one of the two or more sets of encoded data slices based on one or more of a predetermination, a DSN activity level, a reliability requirement, a timing performance requirements, and a bandwidth requirement. The selecting includes identifying the unique sets of dispersal parameters corresponding to each of the two or more sets of encoded data slices (e.g., a vault lookup, a registry information look up, initiating a query, receiving dispersal parameters) and selecting the one of the two or more sets of encoded data slices based on a corresponding unique set of dispersal parameters associated with the one of the two or more sets of encoded data slices. For example, the retrieve module 412 selects a unique set of dispersal parameters with a lowest pillar width when the DSN activity level indicates an above average level of activity. As another example, the retrieve module selects another unique set of dispersal parameters with a highest pillar width when the DSN activity level indicates a below-average level of activity and the reliability requirement includes a higher than average level of required reliability.

The retrieve module 412 determines whether at least a decode threshold number of encoded data slices of the selected set of encoded data slices are recoverable from a corresponding storage unit set. The determining includes at least one of issuing a list request, receiving a list response, issuing read slice requests, and receiving read slice responses that includes at least one of a retrieved first slice set and a retrieved second slice set. When the decode threshold number of encoded data slices are recoverable, the retrieve module 412 decodes the at least the decode threshold number of retrieved encoded data slices using the dispersed storage error coding function and in accordance with the selected unique set of dispersal parameters to produce the recovered data 416. When the decode threshold number of encoded data slices are not recoverable, the retrieve module 412 selects another set of encoded data slices of the two or more sets of encoded data slices retrieves at least a decode threshold number of encoded data slices of the other set of encoded data slices, and decodes the at least the decode threshold number of encoded data slices of the other set of encoded data slices using the dispersed storage error coding function and in accordance with a corresponding unique set of dispersal parameters to produce the recovered data. The selecting the other set of encoded data slices includes selecting a next best set of unique set of dispersal parameters associated with the other set of encoded data slices. For example, the retrieve module selects the first slice set associated with the pillar width of 16 as the other set of encoded data slices.

FIG. 10 is a flowchart illustrating an example of accessing data. The method begins to store data with step 418 where a processing module (e.g., of a store module, of a retrieve module, of a distributed storage and task (DST) client module) encodes data using a dispersed storage error coding function in accordance with a first set of dispersal parameters to produce a first set of encoded data slices. The encoding may further include segmenting a data object to produce a plurality of data segments and encoding a first data segment of the plurality of data segments. The method continues at step 420 where the processing module stores the first set of encoded data slices in a first storage unit set. The storing includes generating a set of slice names, generating a set of write slice requests that includes the set of slice names and the first set of encoded data slices, and outputting the set of write slice requests to the first storage unit set.

The method continues at step 422 where the processing module transforms the data to produce a representation of the data. The transforming includes applying at least one of a null transformation, a compression algorithm, a redacting algorithm, an encryption algorithm, a deterministic function, and an interleaving function. The method continues at step 424 where the processing module encodes the representation of the data using the dispersed storage error coding function and in accordance with a second set of dispersal parameters to produce a second set of encoded data slices.

The method continues at step 426 where the processing module stores the second set of encoded data slices in a second storage unit set. The method continues at step 428 where the processing module updates one or more of a dispersed hierarchical indexes in a directory with regards to storage of the first and second sets of encoded data slices. The updating includes associating dispersed storage network (DSN) addresses of the first and second sets of encoded data slices with an identifier of the data.

The method continues, when retrieving data, at step 430 where, for each data segment of the plurality data segments, the processing module identifies two or more sets of encoded data slices. The identifying includes at least one of accessing the dispersed hierarchical index and accessing the directory to identify two or more DSN addresses associated with the two or more sets of encoded data slices. The method continues at step 432 where the processing module selects one of the two or more sets of encoded data slices. The selecting includes identifying a DSN address of a set of encoded data slices associated with an expected performance level that compares favorably to a desired performance level (e.g., a smallest width when minimizing input/output operations).

The method continues at step 434 where the processing module determines whether at least a decode threshold number of encoded data slices of the selected set of encoded data slices are retrievable, for example by using a list of slices, or by attempting to retrieve slices. As illustrated by block 435, the method branches to step 438 when the at least the decode threshold number of encoded data slices of the selected set of encoded data slices are not retrievable. The method continues to step 436 when the at least the decode threshold number of encoded data slices of the selected set of encoded data slices are retrievable.

The method continues at step 436, where the processing module decodes a decode threshold number of retrieved encoded data slices using the dispersed storage error coding function and in accordance with dispersal parameters associated with the selected set of encoded data slices to reproduce the data.

When the at least the decode threshold number of encoded data slices of the selected set of encoded data slices are not retrievable, the method continues at step 438 where the processing module selects another of the two or more sets of encoded data slices. The selecting includes identifying another DSN address of the other set of encoded data slices associated with an expected performance level that compares most favorably to the desired performance level (e.g., a next smallest width when minimizing input/output operations). The method continues at step 440 where the processing module decodes the decode threshold number of other retrieved encoded data slices using the dispersed storage error coding function and in accordance with dispersal parameters associated with the other set of encoded data slices to reproduce the data. Alternatively, or in addition to, the method may continue in a similar fashion to try as many of the two or more sets of encoded data slices to obtain at least a decode threshold number of encoded data slices.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for use in a distributed storage network (DSN) including a plurality of distributed storage (DS) units configured to store encoded data slices, the method comprising:
    storing, in a standard-width vault including a first plurality of DS units, a first set of data slices corresponding to a first representation of a data object, the first set of data slices including at least a first write-threshold number of data slices encoded using a first set of dispersal parameters, wherein the first set of dispersal parameters specifies a first write-width and a first read-width associated with the standard-width vault;
    storing, in a low-width vault including a second plurality of DS units, a second set of data slices corresponding to a second representation of the data object, the second set of data slices including at least a second write-threshold number of data slices encoded using a second set of dispersal parameters, wherein:
        the second set of dispersal parameters specifies a second write-width and a second read-width associated with the low-width vault;
        at least one of the second write-width or the second read-width associated with the low-width vault is less than a corresponding first write-width or first read-width associated with the standard-width vault;
    receiving a read request associated with the data object;
    determining that the first representation of the data object is stored in the standard-width vault;
    determining that the second representation of the data object is stored in the low-width vault;
    selecting between retrieving either the first representation of the data object from the standard-width vault or the second representation of the data object from the low-width vault, wherein the selecting is based on a performance associated with at least one of the standard-width vault or the low-width vault; and retrieving the first representation of the data object or the second representation of the data object in accordance with the selecting.

2. The method of claim 1, further comprising:
  determining that the second representation of the data object is not retrievable from the low-width vault; and
  retrieving the first representation of the data object from the standard-width vault in response to determining that the second representation of the data object is not retrievable.

3. The method of claim 1, wherein the selecting to retrieve includes:
  determining expected performance levels of the standard-width vault and the low-width vault; and
  selecting between retrieving either the first representation of the data object from the standard-width vault or the second representation of the data object from the low-width vault based, at least in part, on the expected performance levels.

4. The method of claim 1, further comprising:
  deriving the second representation of the data object from the first representation of the data object, wherein the second representation is a reduced-size version of the first representation.

5. The method of claim 1, further comprising:
  receiving a write request associated with a particular data object; and
  in response to receiving the write request, determining which of the standard-width vault and the low-width vault to use for storage of the particular data object based, at least in part, on indicators associated with the particular data object.

6. The method of claim 5, wherein the indicators associated with the particular data object include at least one of: an object size, an object fidelity, an expected frequency of write operations, or a flag passed from a requester.

7. A computing device for use in a distributed storage network (DSN) including a plurality of distributed storage (DS) units configured to store encoded data slices, the computing device including:
  a processor and associated memory configured to:
    store, in a standard-width vault including a first plurality of DS units, a first set of data slices corresponding to a first representation of a data object, the first set of data slices including at least a first write-threshold number of data slices encoded using a first set of dispersal parameters, wherein the first set of dispersal parameters specifies a first write-width and a first read-width associated with the standard-width vault;
    store, in a low-width vault including a second plurality of DS units, a second set of data slices corresponding to a second representation of the data object, the second set of data slices including at least a second write-threshold number of data slices encoded using a second set of dispersal parameters, wherein:
      the second set of dispersal parameters specifies a second write-width and a second read-width associated with the low-width vault;
      at least one of the second write-width or the second read-width associated with the low-width vault is less than a corresponding first write-width or first read-width associated with the standard-width vault;
    receive a read request associated with the data object;
    determine that the first representation of the data object is stored in the standard-width vault;
    determine that the second representation of the data object is stored in the low-width vault;
    select, based on a performance associated with at least one of the standard-width vault or the low-width vault, between retrieving either the first representation of the data object from the standard-width vault or the second representation of the data object from the low-width vault; and
    retrieve the first representation of the data object or the second representation of the data object in accordance with the selecting.

8. The computing device of claim 7, the processor and associated memory further configured to:
  determine that the second representation of the data object is not retrievable from the low-width vault; and
  retrieve the first representation of the data object from the standard-width vault in response to determining that the second representation of the data object is not retrievable.

9. The computing device of claim 7, the processor and associated memory further configured to:
  determine expected performance levels of the standard-width vault and the low-width vault; and
  select between receiving either the first representation of the data object from the standard-width vault or the second representation of the data object from the low-width vault based, at least in part, on the expected performance levels.

10. The computing device of claim 7, the processor and associated memory further configured to:
  derive the second representation of the data object from the first representation of the data object, wherein the second representation is a reduced-size version of the first representation.

11. The computing device of claim 7, the processor and associated memory further configured to:
  receive a write request associated with a particular data object; and
  in response to receiving the write request, determine which of the standard-width vault and the low-width vault to use for storage of the particular data object based, at least in part, on indicators associated with the particular data object.

12. The computing device of claim 11, wherein the indicators associated with the particular data object include at least one of: an object size, an object fidelity, an expected frequency of write operations, or a flag passed from a requester.

13. A distributed storage network (DSN) comprising:
  a plurality of distributed storage (DS) units configured to store and retrieve encoded data slices;
  a computing device coupled to the plurality of DS units via a communications network, the computing device including a processor and memory configured to implement a storage module, the storage module configured to:
    store, in a standard-width vault including a first plurality of DS units, a first set of data slices corresponding to a first representation of a data object, the first set of data slices including at least a first write-threshold number of data slices encoded using a first set of dispersal parameters, wherein the first set of dispersal parameters specifies a first write-width and a first read-width associated with the standard-width vault;
    store, in a low-width vault including a second plurality of DS units, a second set of data slices corresponding to a second representation of the data object, the second set of data slices including at least a second write-threshold number of data slices encoded using a second set of dispersal parameters, wherein:
the second set of dispersal parameters specifies a second write-width and a second read-width associated with the low-width vault;
at least one of the second write-width or the second read-width associated with the low-width vault is less than a corresponding first write-width or first read-width associated with the standard-width vault;
the processor and associated memory further configured to implement a retrieve module, the retrieve module configured to:
receive a read request associated with the data object;
determine that the first representation of the data object is stored in the standard-width vault;
determine that the second representation of the data object is stored in the low-width vault;
select, based on a performance associated with at least one of the standard-width vault or the low-width vault, between retrieving either the first representation of the data object from the standard-width vault or the second representation of the data object from the low-width vault; and
retrieve the first representation of the data object or the second representation of the data object in accordance with the selecting.

14. The distributed storage network (DSN) of claim 13, the retrieve module further configured to:
determine that the second representation of the data object is not retrievable from the low-width vault; and
retrieve the first representation of the data object from the standard-width vault in response to determining that the second representation of the data object is not retrievable.

15. The distributed storage network (DSN) of claim 13, the retrieve module further configured to:
determine expected performance levels of the standard-width vault and the low-width vault; and
select to retrieve either the first representation of the data object from the standard-width vault or the second representation of the data object from the low-width vault based, at least in part, on the expected performance levels.

16. The distributed storage network (DSN) of claim 13, the computing device further configured to:
derive the second representation of the data object from the first representation of the data object, wherein the second representation is a reduced-size version of the first representation.

17. The distributed storage network (DSN) of claim 13, the storage module further configured to:
receive a write request associated with a particular data object; and
in response to receiving the write request, determine which of the standard-width vault and the low-width vault to use for storage of the particular data object based, at least in part, on at least one of: an object size, an object fidelity, an expected frequency of write operations, or a flag passed from a requester.

* * * * *